(12) United States Patent
Osborne et al.

(10) Patent No.: US 10,049,146 B2
(45) Date of Patent: *Aug. 14, 2018

(54) METHOD AND APPARATUS FOR STORING AND RETRIEVING PROFILE DATA FOR ELECTRONIC DEVICES

(71) Applicant: Samsung Electronics Co., Ltd., Gyeonggi-do (KR)

(72) Inventors: John Osborne, Incline Village, NV (US); David W. Russell, Incline Village, NV (US)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,869

(22) Filed: Nov. 19, 2014

(65) Prior Publication Data

US 2015/0081631 A1 Mar. 19, 2015

Related U.S. Application Data

(63) Continuation of application No. 14/221,993, filed on Mar. 21, 2014, which is a continuation of application No. 13/966,994, filed on Aug. 14, 2013, now Pat. No. 8,737,967, which is a continuation of application No. 12/030,777, filed on Feb. 13, 2008, now Pat. No. 8,526,918, which is a continuation-in-part of (Continued)

(51) Int. Cl.
| | | |
|---|---|---|
| *H04M 1/725* | (2006.01) | |
| *G06F 17/30* | (2006.01) | |
| *H04L 29/08* | (2006.01) | |
| *H04L 29/14* | (2006.01) | |
| *H04W 8/24* | (2009.01) | |
| *H04M 1/2745* | (2006.01) | |
| *H04M 3/42* | (2006.01) | |

(52) U.S. Cl.
CPC .... *G06F 17/30581* (2013.01); *H04L 67/1095* (2013.01); *H04L 69/40* (2013.01); *H04M 1/72525* (2013.01); *H04W 8/245* (2013.01); *H04M 1/274516* (2013.01); *H04M 3/42* (2013.01); *H04M 2203/553* (2013.01)

(58) Field of Classification Search
CPC .................................................. G06F 17/30581
USPC ...................................................... 455/412.1
See application file for complete search history.

(56) References Cited

U.S. PATENT DOCUMENTS

| | | |
|---|---|---|
| 5,583,917 A | 12/1996 | Jonsson |
| 5,940,752 A | 8/1999 | Henrick |

(Continued)

FOREIGN PATENT DOCUMENTS

WO  WO 0143408  6/2001

*Primary Examiner* — Joel Ajayi
(74) *Attorney, Agent, or Firm* — The Farrell Law Firm, P.C.

(57) ABSTRACT

Apparatuses for storing, transmitting, and identifying changes in relation to, data are provided. One of these apparatuses is a server which includes a processor-implemented controller that receives data from a first electronic device external to the server, determines whether a user identification corresponding to a second electronic device external to the server matches a specified user identification, and transmits at least one portion of the data to the second electronic device based at least in part on a determination that the user identification matches the specified user identification.

20 Claims, 4 Drawing Sheets

Related U.S. Application Data application No. 10/409,332, filed on Apr. 7, 2003, now Pat. No. 7,340,244.

(60) Provisional application No. 60/370,640, filed on Apr. 5, 2002, provisional application No. 60/419,290, filed on Oct. 15, 2002.

(56) References Cited

U.S. PATENT DOCUMENTS

| | | |
|---|---|---|
| 5,974,238 A | 10/1999 | Chase, Jr. |
| 6,075,983 A | 6/2000 | Kumagai |
| 6,128,372 A | 10/2000 | Tsai et al. |
| 6,404,884 B1 * | 6/2002 | Marwell ............... H04M 3/432 379/218.01 |
| 6,585,778 B1 | 7/2003 | Hind et al. |
| 6,956,833 B1 | 10/2005 | Yukie et al. |
| 7,003,463 B1 | 2/2006 | Maes et al. |
| 7,058,698 B2 | 6/2006 | Chatterjee et al. |
| 7,107,043 B2 | 9/2006 | Aoyama |
| 2002/0039899 A1 | 4/2002 | Rossman |
| 2002/0081995 A1 | 6/2002 | Leppinen et al. |
| 2002/0098855 A1 | 7/2002 | Harlmaier et al. |
| 2002/0138625 A1 * | 9/2002 | Bruner .................. H04L 29/06 709/227 |
| 2003/0125057 A1 | 7/2003 | Pesola |
| 2004/0203579 A1 | 10/2004 | Comp |

* cited by examiner

METHOD AND APPARATUS FOR STORING AND RETRIEVING PROFILE DATA FOR ELECTRONIC DEVICES

PRIORITY

This application is a continuation of U.S. patent application Ser. No. 14/221,993 filed on Mar. 21, 2014, which is a continuation of U.S. patent application Ser. No. 13/966,994 filed on Aug. 14, 2013, now U.S. Pat. No. 8,737,967, which is a continuation of U.S. patent application Ser. No. 12/030,777 filed on Feb. 13, 2008, now U.S. Pat. No. 8,526,918, which is a continuation-in-part of U.S. patent application Ser. No. 10/409,332 filed on Apr. 7, 2003, now U.S. Pat. No. 7,340,244, which claims the benefit of U.S. Provisional Patent Application No. 60/370,640 filed Apr. 5, 2002 and U.S. Provisional Patent Application No. 60/419,290 filed Oct. 15, 2002, the entire contents of each of which is incorporated herein by reference.

BACKGROUND OF THE INVENTION

1. Field of the Invention

The present invention relates to a method and apparatus for achieving and retrieving data from electronic devices.

2. Description of the Related Art

Cellular telephone handsets and PDAs (Personal Data Assistants) have had a similar evolution in that cell phone functions and applications have been growing rapidly. Cell phones may be personalized for contact lists, ring tones, text style, initial screen images, date and time display, and many other standard functions. In fact, in GSM phones there are over eighty entries for user-personalized data. In addition, personal data in the form of phone book entries, stored images, audio files, favorite radio stations, calendar and appointment books, financial data (electronic wallets), and stocks to watch are now being stored in the cell phone.

With such a wealth of stored data, a problem arises if the phone is lost or stolen, or ceases to function from electronic failure or dropping of the phone. In these events, all of the data may be lost and it can be extremely difficult and time consuming, if not impossible, to recreate the data in a new device.

While some personal devices such as PDAs are routinely backed-up or synchronized with a personal computer (PC), a PC is not always available in the time or place where the phone is lost. Most cell phones do not have a standard synchronization mechanism, and new standards such as SyncML only handle portions of the user data, require an Internet connection and account, and a synchronization PC. These services also require a high speed data connection, which may be expensive and underutilized by the average consumer.

Other patents appear to try to make the data stored in mobile devices more transportable. Tsai (U.S. Pat. No. 6,128,372) and Baranowski (WO01/43408 A1) appear to describe devices that may be attached to telephones to transfer and store data. Jacobs (WO98/34203) appears to describe a cell phone that stores financial account numbers and teaches an interface to allow the numbers to be selected for use in transactions and transmitted to banking systems for verification. Jonsson (U.S. Pat. No. 5,583,917) appears to show how user service profiles, i.e. the provider's record of services available to the user, can be stored and moved around a wireless network to provide faster connection times. Kumagai (U.S. Pat. No. 6,075,983) appears to suggest how the personal data for several operators may be stored within a wireless device and selected. Reference JP-A-21884/1994 appears to describe how a master machine connected via a cable channel can download profile settings for individual operators to a slave machine. Henrick (U.S. Pat. No. 5,940,752) appears to describe remote programming of data from a PC to a wireless terminal.

The references above fail to provide an archival method for loading and reloading cell phone, PDA, or wireless device wherein:

1) No additional devices, software, or computers are required of the user.

2) All interaction, user interfaces, and control are supplied by the wireless device.

3) Data is first uploaded out of the wireless device to populate the entries in the database.

4) Data stored in a remote network may be altered and/or downloaded into another device.

5) The remote network is independent of the actual wireless terminal, wireless network, or data transport layer used to make the connection.

SUMMARY OF THE INVENTION

The various embodiments of the present invention may, but do not necessarily, achieve one or more of the following advantages:

the ability to restore data to a wireless device without additional devices, software, or computers being required of a user;

the ability to remotely store data associated with a wireless device without additional devices, software, or computers being required of a user;

use data stored in a wireless device to populate entries in a remote database; alter data stored remotely;

transmit data stored remotely to a device different than the device from which the data originally came;

convert wireless device data into a format independent of the identity of the wireless device;

provide a remote network that is independent of the actual wireless terminal, wireless network, or data transport lawyer used to make the connection between the wireless device and the remote network;

provide an archival system where all interaction, user interfaces, and control are supplied by the wireless device;

allow data stored remotely to be transmitted to wireless devices of multiple users, allow archival functions to occur by user action or to occur automatically; and allow archival functions to be initiated by a remote network or by the wireless device.

These and other advantages may be realized by reference to the remaining portions of the specification, claims, and abstract.

According to one aspect of the present invention, an apparatus includes a memory; and a processor-implemented controller which: identifies a change in relation with data stored in the memory; and transmits at least one portion of the data updated according to the change to a server, the at least one portion of the data to be transmitted from the server to an electronic device external to the apparatus based at least in part on an indication that a user identification corresponding to the electronic device matches a specified user identification.

According to another aspect of the present invention, a server includes a processor-implemented controller which: receives data from a first electronic device external to the server; determines whether a user identification corresponding to a second electronic device external to the server matches a specified user identification; and transmits at least one portion of the data to the second electronic device based at least in part on a determination that the user identification matches the specified user identification.

According to yet another aspect of the present invention, an apparatus includes a memory which stores first data; and a processor-implemented controller which: receives, via a server, second data transmitted from an electronic device external to the apparatus; and updates the first data using at least a portion of the second data based at least in part on an indication that a first user identification corresponding to the apparatus matches a second user identification corresponding to the electronic device.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

In the following detailed description of embodiments of the present invention, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention comprises a method whereby a user can make a call to a predefined telephone number, either a toll free (800 number) or a service fee (900 number) service. The method may also be initiated through a number shortcut (Short Number) or a menu entry stored in a wireless device, such as a phone. If no service has been established for that phone, the user may be prompted to establish service and supply a personal identification number (PIN). Once service and personal identification are established, the application may prompt whether the user wishes to archive or restore their personal data. Once an option is selected, the call may terminate.

After termination, a second background transaction may begin with the phone, usually without any indication to the user. In most phones, this would occur over the Small Messaging Service (SMS) channel of the phone, but the service may be independent of the data transport layer used by a particular service provider. Other channels may be available depending on the phone service and type, for example GPRS, SyncML, and 3GPP services. These back-channel communication applications may perform the archive or restore function (collectively referred to as archival functions), and a text message may be sent to the user at the completion of the process with notification of successful completion or errors.

The use of the same number for restore operations may allow a new phone (wireless phone, such cellular phones) or portable device to be purchased anywhere in the world, and the profiles and data restored at any time. As a consequence of being able to restore any user profile based on a phone number and a PIN, multiple people may share a single phone, such as can happen when employees share an "on-call" cellular, or family members share a single phone, and each may restore his or her personal settings when in use.

Figure 1:
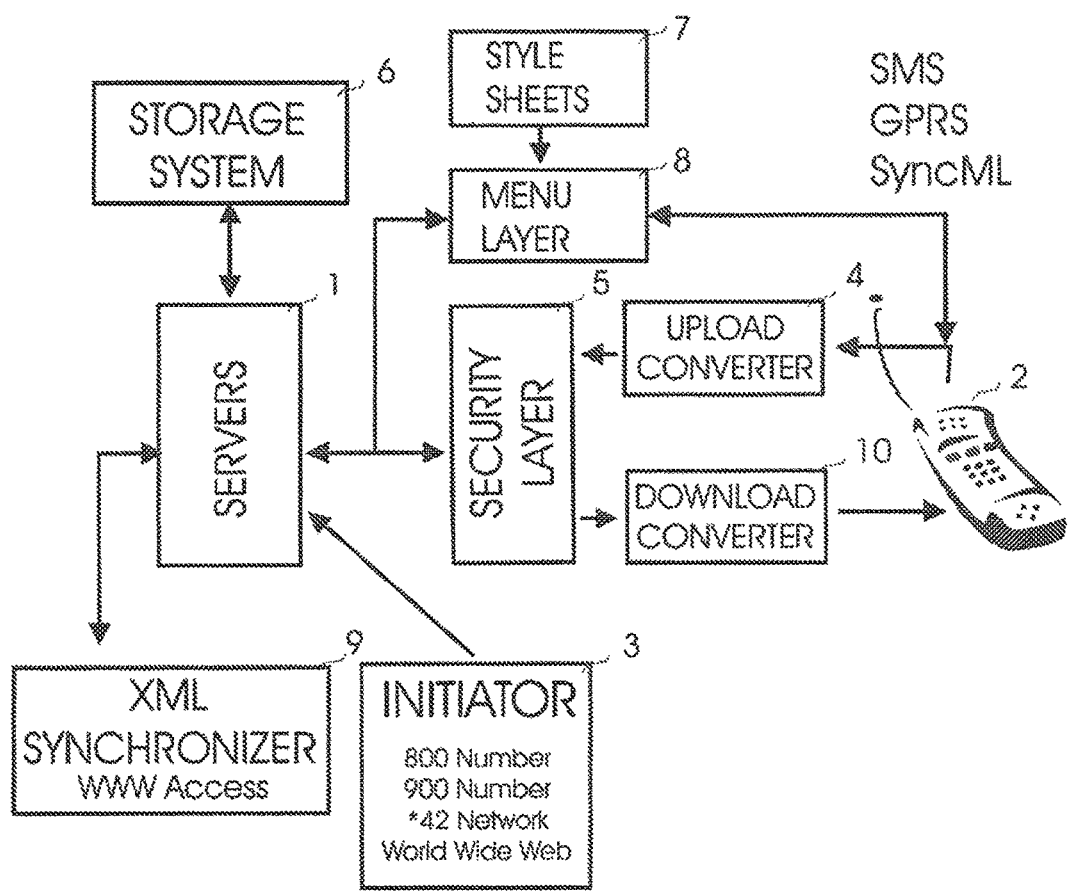
FIG. 1 is substantially a block diagram of the server/application software of the invention.

As shown in FIG. 1, a server system 1 exists with a connection to wireless service providers, Small Message Service Centers (SMSC), and/or the Internet. Other connections may be required depending on the technology used by the service provider. The user's primary interface to the system is through the user's wireless device 2. Wireless device 2 may be a cellular phone, wireless phone, PDA, palm or laptop computer, and other similar devices known in the art. The wireless device may drive contact to the system through the Initiator 3. Again, depending on the preferred method of the service provider, the initiator sequence may be an SMS message, a voice connection (800, 900, or local call, etc.), a wireless Web browser, or JAVA/WAP application, for example.

In another embodiment, a small application program may be installed on the cell phone (or other device) itself to provide a menu entry for the archive/restore operation, rather than dialing a stored number. The method of contact initiation and the data carrier can be any supported technology. The originating phone number (and optionally, PIN number) may be supplied in the message. This part of the user interaction is also detailed in FIG. 3 user initiate message 16 and as time sequence T0 in the timeline depicted in FIG. 2.

Figure 2:
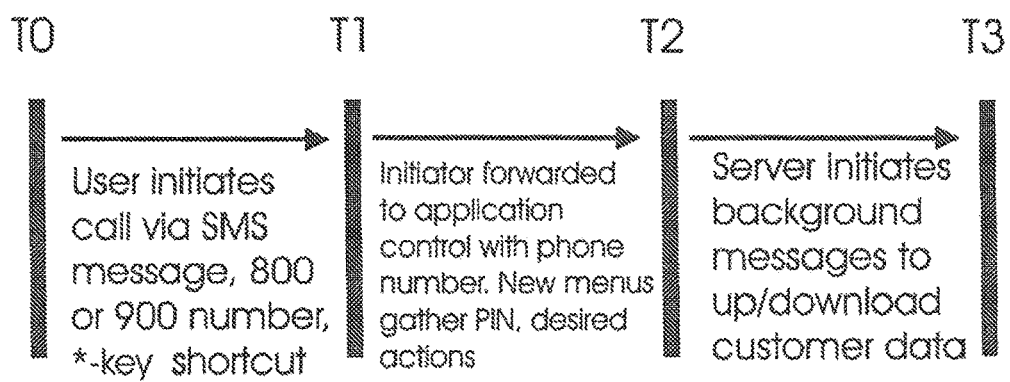
FIG. 2 is substantially the sequence of events experienced by the user in normal operation.

With continued reference to FIGS. 1 and 2, in T1, initiator 3 forwards the information in the contact message to the application server 1.

Figure 3:
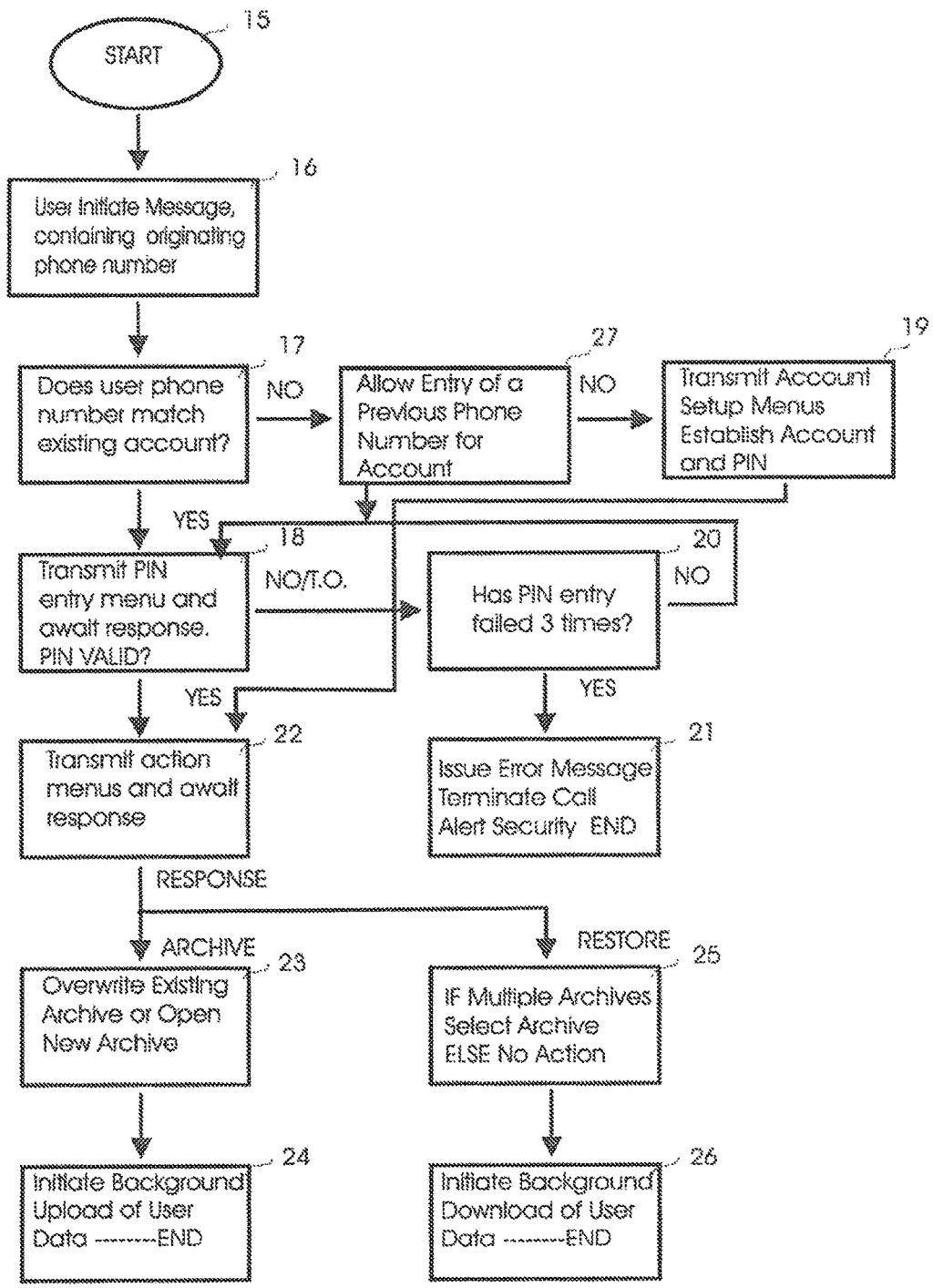
FIG. 3 is substantially a flowchart of the system functions for the user to initiate the service and operation thereof.

The server then begins communication with the wireless device. In FIG. 3, the first operation 17 may be to determine if the phone number forwarded by the initiator matches an existing account. If so, then the server checks the message to see if the PIN number was automatically transmitted in the original message. This is optional to simplify the user interface and remove one interaction step required of the user. If no account exists for this user, one may be established in step 19. Depending on the network provider, billing may be automatically established in the user account, or a credit card account number may be required to establish service. In either case, two messages may be sent to the user to (A) provide a final confirmation to establish a new billing account, and (B) to establish a PIN number for the account. If the user has changed phone numbers, the old phone number used for the account may be entered in 27.

If the account exists and no PIN number was supplied, the user may be prompted to enter the identification number 18. If the number is invalid or the request times out, the user may be allowed a certain number of times, for example three tries, 20 to enter the correct PIN. If all attempts fail, an error message may be transmitted to the device, the call may be terminated, and security may be notified 21.

With a valid account and PIN number, the system can now transmit a menu to the user, who can select the function to be performed. In another embodiment, the interface can be simplified by providing different initiator messages, menus, or numbers for each function.

The interface next establishes which archival function—usually Archive or Restore—the user desires, 22. In order to support a number of different devices, a set of Style Sheets 7 (FIG. 1) may be read by the Menu Layer 8 to format the messages of the server and initiator appropriately for a given wireless device. The system may also allow multiple sets of data to be stored for each account.

With reference to FIG. 3, at 23, if the user has selected the Archive function, and if a data set already exists, an additional menu may prompt the user to determine if the original data should be overwritten or a new set established. If multiple sets already exists, the user may select to overwrite one of the existing sets or establish a new one.

For the Restore function 25, if no data sets exist an error message may be initiated. If exactly one set exists, the system may proceed directly to the Restore function. If multiple sets exist, the user may be prompted through a menu to select which data set to restore. Once the function and all parameters are established, the initial call may be terminated.

In a present embodiment, the server then initiates a background data communications channel with the wireless device, represented at T3 in FIG. 2. The background communications channel may be through SMS messaging, GPRS data packets, SyncML protocol, or any other means as dictated by the wireless network provider. If an Archive function is selected (illustrated in FIG. 3 at 24), data from the device may be uploaded to the server and stored in the user's account.

With reference to FIG. 1, Upload Converter 4 may convert the data to a hardware-independent format before storage. Security in the form of encryption of the data may be applied within the wireless device and in the server system 5. In some cases the encryption function may be built into the wireless device, and in some cases additional software may need to be downloaded to the device before the data transfer. The purpose of the security may protect the user's data from eavesdropping when traversing the wireless network.

If the Restore function is selected (FIG. 3, 26), the user's data may be downloaded to the device. As with the Archive function, security may be applied to encrypt the data stream. The Download Converter 10 may check the exact type of hardware that is receiving the data stream, and may need to reformat the stored data to be compliant with the device. This function may allow the user to change devices within the Archive/Restore sequence. This is often required in the case of uploading data from a cellular phone and then restoring to a PDA, or if the user decides to upgrade to a new phone model after loss of the original phone.

Internet access over the World Wide Web 9 may also be supported, allowing the user the option to set up accounts, alter stored data, or initiate services from their personal computer, as well as their wireless device.

In another embodiment, a stored application program may automatically perform the archive procedure periodically, or whenever changes are made to stored files.

In another embodiment, the archive service provider may work with a database supplied by the user, or a group of users, to upload, modify, and then download changes to the shared data. For example, a shared contact database for a company may be stored by the archive service provider, and when the user's archive is completed it may be compared to the company database and new numbers added to the user's phone list, and subsequently downloaded, to automatically update his or her list.

In another embodiment, personalization and user data from a portable device capable of being synchronized with a personal computer may be uploaded from the PC to the service provider to make that data available for restoration at any time or place.

In another embodiment, global or local changes to existing contact data, such as an area code change or the change of a user's telephone number, could be automatically propagated to all users whose contacts database matches the change.

In another embodiment, the service could select the data transport layer most appropriate for each device. For example, most phones have the ability to send and receive SMS messages, but only a few users actually request/pay for GPRS or World Wide Web access. The application may select the fastest/most appropriate carrier available on the given device.

In another embodiment, the archive and restore applications, and/or the access numbers associated with the applications, could be split such that a different application or a different access number are utilized for each.

In another embodiment, the handset application might not disconnect, but provide a visible user interface and progress indication to the user throughout the backup or restore operation.

In another embodiment, a voice-activated dialup service might be used to initiate the application, or to establish accounts or initiate the download of the application software to the handset.

In another embodiment, an Internet browser, either on a personal computer or the wireless handset, could be used to initiate the application, establish or modify accounts, or download the application software.

In another embodiment, security software could encrypt the data stream to prevent unauthorized interception of the user's data.

Computer source code (in the C++ programming language) illustrating various embodiments of the invention is provided in a concurrently filed (Apr. 7, 2003) provisional patent application. The entirety of this provisional application is hereby expressly incorporated by reference into the present application.

Figure 4:
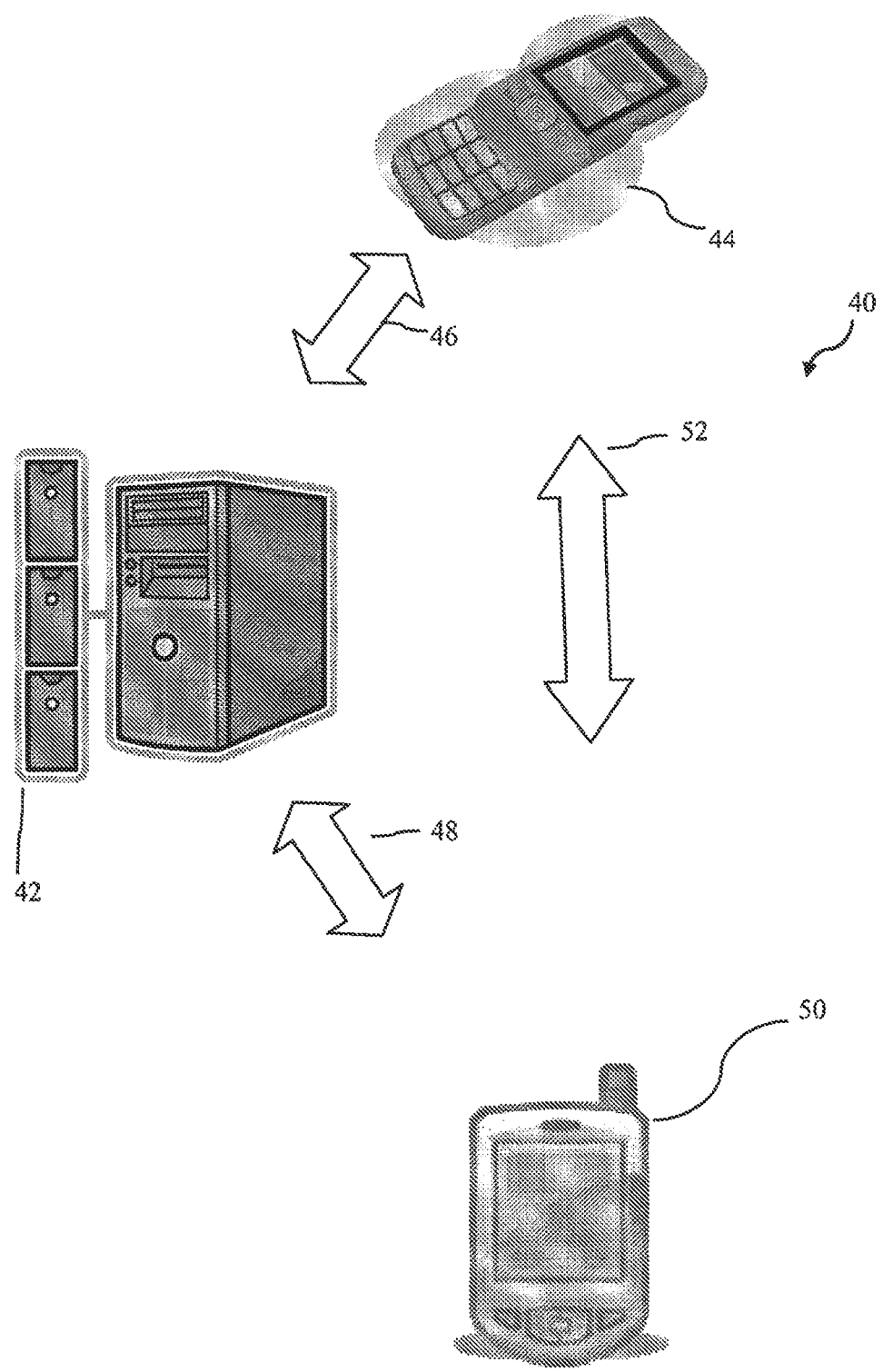
FIG. 4 is substantially a schematic diagram of one embodiment of the invention.

As seen in FIG. 4, the present invention also comprises a system 40 for transferring information between personal devices. System 40 comprises storage device 42 that is used to store information from one or more personal device 44. Storage device 42 may be accessed by personal device 44 via communication device 46 and many different communication protocols and methods of communication may be used, such as those previously discussed. Storage device 42 may be a computer server in communication with one or more hard drives or other mass storage devices. The user of personal device 44 may indicate some or all of information stored on storage device 42 as being available for download. This information may include any class or kind of information, such as text, pictures, videos, web site addresses, phone numbers, sound, music, locations, device preferences, programs and lists.

Once information is stored on storage device 42, it may be made available for others to access. A user using personal device 50 may be able to use or download the information from storage device 42.

Various fees may be charged for allowing users to store or access information. For example, a user may be charged a fee each time the user accesses storage device 42 or downloads information from the device. In the alternative, information storage and access may be included as part of the normal service by a communication provider.

In another embodiment storage device 42 does not store the information, but only stores the location of the information. The information may have a unique address that is capable of directing users to the information. For example, a user of personal device 44 may indicate that certain information is to be made available to others. This may be done by checking a box or putting a file with the information in a designated folder. The information may be available to various groups of people. For example, only designated people or devices may have access to the information and the accessing party may need a password or code to obtain access to the information.

The information may be assigned a unique name or address. Identifying information is then transmitted to storage device 42. The identifying information may include descriptive material that can be used by others to locate the information. The descriptive material may include title, author, date, an abstract, etc. The descriptive material may be generated by a user or it may be generated automatically by software that is capable of searching for the appropriate information. A user of personal device 50 may then become aware of the information by searching through the device. Searching may be performed using key words. In another embodiment, the user of personal device 50 may become aware of the availability of the information through a text message, email or other notification.

Once personal device 50 obtains the address or location of the information, personal device 50 may initiate contact with personal device 44 directly through communication device 52 and the information may be accessed. In this way, storage device 42 is not used to provide direct access to the information.

System 40 may use proprietary communication networks that are not directly part of other well known communication networks, such as the Internet. This may provide greater security and privacy to users.

Although the description above contains many specifications, these should not be construed as limiting the scope of the invention but as merely providing illustrations of some embodiments of this invention. Thus, the scope of the invention should be determined by the appended claims and their legal equivalents rather than by the examples given.

What is claimed is:

1. A portable communication device comprising:
communication circuitry;
memory to store a first user identification corresponding to the portable communication device; and
a processor-implemented controller adapted to:
identify a change including an addition, a modification or a deletion with respect to multimedia data stored in the memory;
establish, using the communication circuitry, a back-channel communication link with a server through a SyncML protocol based at least in part on the identifying of the change; and
transmit at least one portion of the multimedia data updated according to the change to the server via the back-channel communication link, the at least one portion of the multimedia data to be transmitted from the server to an electronic device external to the portable communication device based at least in part on an indication that a second user identification corresponding to the electronic device is associated with a same user billing account as the first user identification,
wherein the at least one portion of the multimedia data is encrypted.

2. The portable communication device of claim 1, wherein the processor-implemented controller is adapted to:
perform the establishing of the back-channel communication link without presenting an indication indicating the back-channel communication link to a user.

3. The portable communication device of claim 1, wherein the processor-implemented controller is adapted to:
receive other multimedia data from the electronic device via the server.

4. The portable communication device of claim 3, wherein the processor-implemented controller is adapted to:
update the other multimedia data received from the electronic device according to a change in relation with the other multimedia data in the electronic device.

5. A server comprising:
a processor-implemented controller adapted to:
receive multimedia data from a first electronic device external to the server and associated with a first user identification, wherein receiving the multimedia data includes establishing a back-channel communication link with the first electronic device through a SyncML protocol based at least in part on a change including an addition, a modification or a deletion with respect to the multimedia data stored in the first electronic device;
determine whether a second user identification corresponding to a second electronic device external to the server is associated with a same user billing account as the first user identification; and
transmit at least one portion of the multimedia data to the second electronic device based at least in part on a determination that the second user identification is associated with the same user billing account as the first user identification,
wherein the multimedia data is encrypted.

6. The server of claim 5, wherein the processor-implemented controller is adapted to update the multimedia data stored in the server according to the change in the first electronic device.

7. A portable communication device comprising:
memory to store a first user identification corresponding to the portable communication device, and first multimedia data; and
a processor-implemented controller adapted to:
receive, via a server, second multimedia data transmitted from an electronic device external to the portable communication device based at least in part on an indication that the first user identification is associated with a same user billing account as a second user identification corresponding to the electronic device, the receiving including establishing a back-channel communication link with the server through a SyncML protocol based at least in part on a change including an addition, a modification or a deletion with respect to the second multimedia data in the electronic device; and
update the first multimedia data using at least a portion of the second multimedia data,
wherein the first and second multimedia data are encrypted.

8. The portable communication device of claim 1, wherein, in response to the transmitting the at least one portion of the multimedia data to the server, the at least one portion of the multimedia data is automatically transmitted from the server to the electronic device.

9. The portable communication device of claim 1, wherein the first user identification and the second user identification comprise a password.

10. The portable communication device of claim 1, wherein the multimedia data includes one or more images to be shared by the portable communication device and the electronic device, and wherein the processor-implemented controller is adapted to:
   detect the change with respect to at least one image of the one or more images stored in the memory.

11. The portable communication device of claim 1, wherein the multimedia data includes one or more images, and wherein the processor-implemented controller is adapted to:
   detect, as at least part of the change, an addition of another image to the multimedia data.

12. The portable communication device of claim 1, wherein the back-channel communication link comprises a communication service provided in relation with a third generation partnership project (3GPP).

13. The portable communication device of claim 1, wherein the background communication channel comprises a channel capable of communicating data packets.

14. The portable communication device of claim 1, wherein the processor-implemented controller is adapted to:
   perform the transmitting based at least in part on a determination that a data type of the at least one portion of the multimedia data corresponds to an image.

15. The server of claim 5, wherein the multimedia data comprises an image.

16. The server of claim 5, wherein the multimedia data includes one or more images, and wherein the processor-implemented controller is adapted to:
   perform the receiving or transmitting based at least in part on an addition of another image to the multimedia data.

17. The server of claim 5, wherein the processor-implemented controller is adapted to:
   perform the receiving or transmitting based at least in part on a determination that a data type of the at least one portion of the multimedia data corresponds to an image.

18. The portable communication device of claim 7, wherein the first or second multimedia data includes one or more images, and wherein the processor-implemented controller is adapted to:
   perform the receiving based at least in part on an addition of another image to the second multimedia data.

19. The portable communication device of claim 7, wherein the back-channel communication link comprises a communication channel communicating data including the first or second multimedia data without indicating the communicating of the data to a user.

20. The portable communication device of claim 7, wherein the processor-implemented controller is adapted to:
   perform the receiving based at least in part on a determination that a data type of the at least one portion of the multimedia data corresponds to an image.

* * * * *